(12) United States Patent
Villar et al.

(10) Patent No.: US 10,100,477 B2
(45) Date of Patent: Oct. 16, 2018

(54) PROTECTIVE MARITIME ASSEMBLY AND METHOD

(71) Applicants: Arturo Cajiga Villar, Miami, FL (US); Vicente Cajiga Villar, Miami, FL (US)

(72) Inventors: Arturo Cajiga Villar, Miami, FL (US); Vicente Cajiga Villar, Miami, FL (US)

( * ) Notice: Subject to any disclaimer, the term of this patent is extended or adjusted under 35 U.S.C. 154(b) by 0 days.

(21) Appl. No.: 15/132,395

(22) Filed: Apr. 19, 2016

(65) Prior Publication Data

US 2017/0298586 A1 Oct. 19, 2017

(51) Int. Cl.
  *E02B 3/04* (2006.01)
  *E02B 3/20* (2006.01)
  *E02B 3/06* (2006.01)
  *E02B 17/00* (2006.01)

(52) U.S. Cl.
  CPC .................. *E02B 3/20* (2013.01); *E02B 3/06* (2013.01); *E02B 17/0017* (2013.01)

(58) Field of Classification Search
  CPC ... E02B 3/046; E02B 3/04; E02B 3/06; E02B 3/20; E02B 3/062; E02B 3/28
  USPC ....... 405/21, 23, 25, 26, 28, 29, 30, 35, 211, 405/212, 218
  See application file for complete search history.

(56) References Cited

U.S. PATENT DOCUMENTS

| 2,731,799 | A | * | 1/1956 | Lange et al. | E02B 3/06 210/513 |
|---|---|---|---|---|---|
| 3,372,552 | A | * | 3/1968 | Liddell | E02B 3/26 114/219 |
| 3,552,131 | A | * | 1/1971 | Mott et al. | E02B 17/00 405/210 |
| 4,468,151 | A | * | 8/1984 | Warlick | E02B 3/06 405/27 |
| 5,562,364 | A | * | 10/1996 | Darder-Alomar | E02B 3/26 114/219 |
| 5,820,295 | A | * | 10/1998 | Buteaux | E02B 3/04 405/16 |
| 6,305,877 | B1 | * | 10/2001 | Cavanagh | E02B 3/062 405/21 |
| 8,814,469 | B2 | * | 8/2014 | McCormick | E02B 3/062 405/21 |
| 9,339,017 | B1 | * | 5/2016 | Walter | A01K 61/006 |
| 2002/0094239 | A1 | * | 7/2002 | Bradley | E02B 17/0026 405/216 |
| 2005/0271470 | A1 | * | 12/2005 | Rytand | E02B 3/06 405/21 |
| 2008/0279631 | A1 | * | 11/2008 | Bishop | E02B 3/06 405/21 |
| 2010/0196098 | A1 | * | 8/2010 | Danskine | E02B 3/062 405/25 |
| 2014/0270962 | A1 | * | 9/2014 | Andrus | E02B 3/06 405/21 |

* cited by examiner

*Primary Examiner* — Carib A Oquendo
(74) *Attorney, Agent, or Firm* — Grogan, Tuccillo & Vanderleeden, LLP (57) ABSTRACT

A water area may be sheltered by installing, at an active boundary of the water area, a plurality of shields mounted on posts, each shield having a lower edge immersed in the water. Each shield may dissipate at least a portion of wave energy approaching the active boundary of the water area. One or more piers may be positioned within the sheltered water area or basin.

1 Claim, 7 Drawing Sheets

PROTECTIVE MARITIME ASSEMBLY AND METHOD

FIELD OF THE INVENTION

The present invention relates in general to a protective maritime assembly and method and, more particularly, to breakwaters or similar structures for use in providing shelter to maritime vessels and associated marinas and harbors.

BACKGROUND OF THE INVENTION

Various breakwaters or harbor shelters have been known and used. The oldest variations in this art have been rubble mounds spilled to form shoals or causeways at the seaward boundaries of harbors. Such rubble mound breakwaters are laborious and therefore expensive to install, may be prone to erosion, and often induce silting of the sheltered harbor. Additionally, rubble mounds remain stable only while the side slopes are shallower than an angle determined both by the constituent rubble and by tidal flows. Accordingly, the volume of stone required for building a rubble mound increases roughly as the square of the bottom depth at the active boundary of a harbor to be sheltered. Nonetheless, shallow breakwaters continue to be constructed in this simple manner.

Where water depth or other factors may deprecate rubble mound breakwaters, caisson constructions have been used. Caisson breakwaters are understood to make use of generally vertical or sloping plates stacked and fastened together, from the bed upward, on at least the seaward face of a rubble fill. Thus, caissons generally can reduce the material requirements for building a breakwater. Placement and attachment of the caisson plates may, however, require significant skilled labor and equipment. Additionally, caisson construction tends to aggravate the silting problem well known from the overall more permeable rubble mounds.

With the forgoing problems and concerns in mind, it is the general object of the present invention to provide a protective maritime assembly and method which overcomes the above-described drawbacks.

SUMMARY OF THE INVENTION

According to one aspect of the present invention, a water area may be sheltered by installing, at an active boundary of the water area, a plurality of shields mounted on posts, each shield having a lower edge immersed in the water.

According to one embodiment of the present invention, a marina includes one or more piers disposed within a basin of water. The marina is sheltered by a wavebreaker apparatus, which includes shields at least partly immersed in the water and anchored at an active boundary of the basin of water to dissipate at least a portion of wave energy approaching the piers.

According to another embodiment of the present invention, a wavebreaker apparatus includes a plurality of shields arrayed within a body of water. Each shield is at least partly immersed in the water. At least one anchor restrains each shield for dissipating at least a portion of wave energy engaging the shield.

According to another embodiment of the present invention, a wavebreaker apparatus includes a shield for deployment in a body of water to dissipate at least a portion of wave energy approaching a basin to be sheltered by the shield.

These and other objects, features and advantages of the present invention will become apparent in light of the following detailed description of exemplary embodiments thereof, as illustrated in the accompanying drawings.

DESCRIPTION OF PREFERRED EMBODIMENTS

As mentioned above, exemplary embodiments of the inventive wavebreaker apparatus are shown in the accompanying drawings, in which similar reference numbers may indicate similar components or structural features except as otherwise described.

Figure 1:
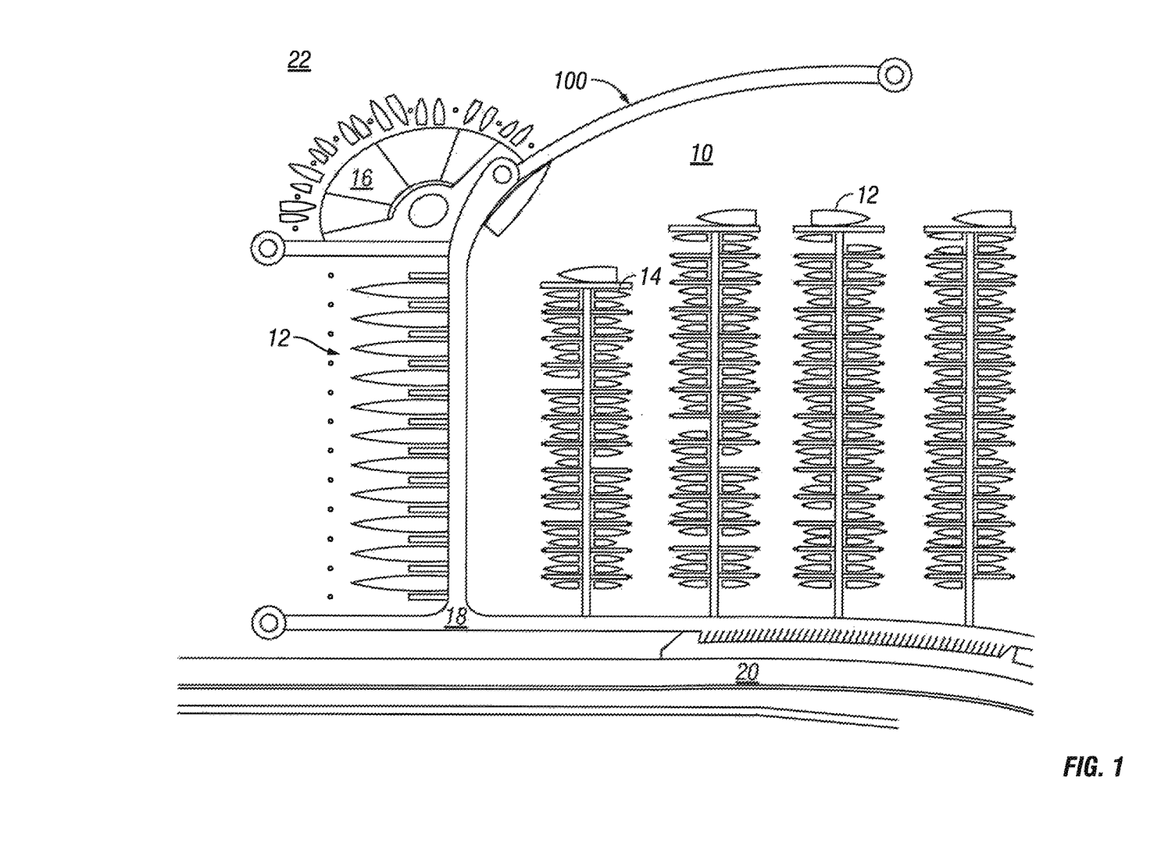
FIG. 1 shows in plan view a marina sheltered by a wavebreaker, according to one aspect of the present invention.

In the drawings, FIG. 1 shows a water area or basin 10 in use as a marina where boats 12 may dock at piers 14. The marina also may include a hospitality structure or shelter 16 such as a restaurant, hotel, or conference center. The piers and the hospitality structure are connected by walkways 18 that permit pedestrian or vehicular access to the piers. In some embodiments the walkways may connect with a parking lot 20, which in turn may connect with a road providing access to the marina from remote points.

The basin 10 is partly bounded and sheltered by a wavebreaker 100 formed according to an embodiment of the present invention. In alternative embodiments of the invention, the wavebreaker supports the walkways, and may also protect and/or support the hospitality structure. As shown FIG. 1, piers for large boats may be disposed on an outer side of the walkways and wavebreaker, within an unsheltered or "open" body of water 22 that may be subject to waves. The wavebreaker 100 serves to separate the basin 10 from the open water 22, which may include a tidal or non-tidal pond, swamp, stream, lake, reservoir, river, inlet, bay, or ocean.

Figure 2:
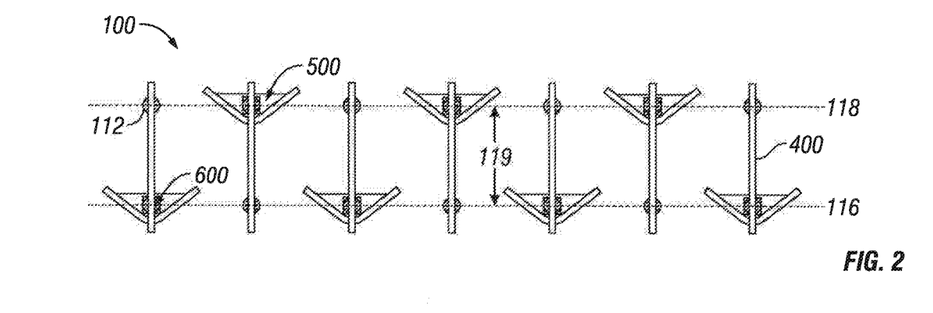
FIG. 2 shows in plan view one embodiment of an inventive wavebreaker.
Figure 3:
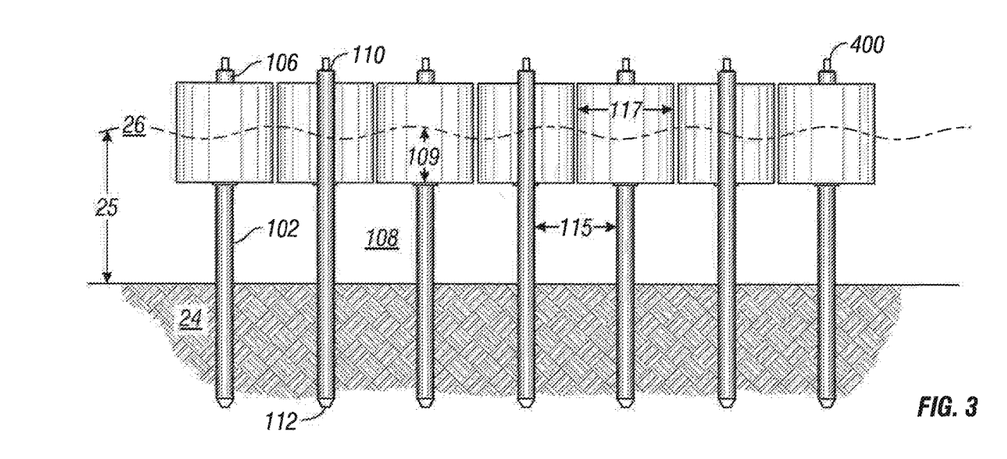
FIG. 3 shows in front elevation view the embodiment shown in FIG. 2.
Figure 4:
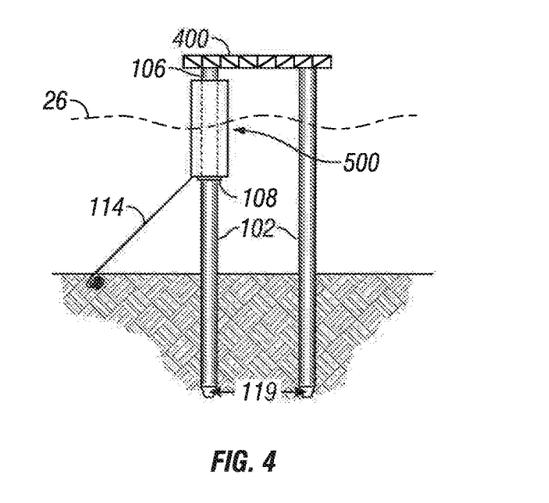
FIG. 4 shows in end elevation view the embodiment shown in FIGS. 2 and 3.

Referring to FIGS. 2-4, it may be seen that according to a first embodiment of the invention, the wavebreaker 100 includes a plurality of shields 500 or 600, further described below with reference to FIGS. 5 and 6, respectively. Each shield 500 or 600 is supported and anchored within the body of water 22 by a piling 102. The wavebreaker apparatus 100 may include additional pilings 102 that do not support shields. In various embodiments, the shields 500 or 600 may alternatively be mounted to posts 106 that extend upward from flanges 108 at the tops of the pilings 102. The posts and flanges both may be formed integrally with the pilings, or the posts and/or flanges may be fastened to the pilings, for example using bolts. Pilings not intended for supporting shields may omit the flange and post, and may be uniform in cross section from bottom end to top end.

In FIGS. 2-4, the pilings 102 are shown in rectilinear array. In other embodiments, the pilings may be arranged along curves (for example, to form the arcuate wavebreaker 100 as shown in FIG. 1), or exhibit other configurations, as necessary, to define the sheltered water area or basin 10. Any particular arrangement of pilings 102, including spacings or gaps between adjacent pilings, may be chosen according to expected wave patterns in the open water 22 and according to the shape of the basin 10, as further discussed below with reference to FIGS. 9-1.

Still further, in other alternative embodiments of the invention, the pilings 102 and/or the posts 106 may be joined at their top ends 110 by girders 400, as shown in FIGS. 2-4 and 9-11. As further discussed below, the girders can support walkways, shelters, or the like. Although not specifically shown, walkways or segments of walkways also may be supported directly by the posts or pilings.

Each piling in FIGS. 3 and 4 is shown with its bottom end 112 embedded into a bottom or bed 24 of the water body 22 at a bed depth 25, such that the flange 108 is disposed at a depth 109 below the mean average waterline 26. In other embodiments (not shown), some or all of the pilings may instead rest upon footings placed on the bed. Pilings that rest on footings may be tethered to the bed by anchor cables 114, substantially as shown for one of the shields 500 in FIG. 4. Footed or embedded pilings may be specified depending upon basin hardness, water depth, and anticipated wave loading. In certain embodiments, at least some of the shields 500 or 600 may be anchored solely by cables, by weighted tethers, or by other structures suitable to restrain horizontal and/or vertical motions of the shields. In certain embodiments, at least some of the shields 500 or 600 may be anchored in a manner permitting limited motion in response to wave energy, such that movement of the shields may dissipate the wave energy.

Figure 5:
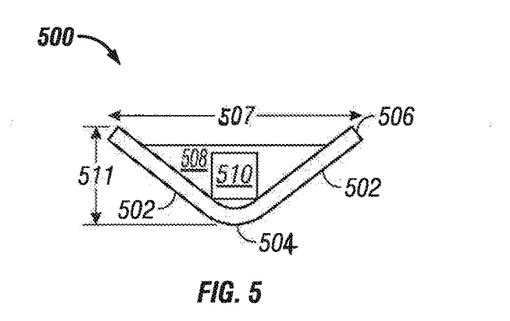
FIG. 5 shows in plan view a shield portion of a wavebreaker according to a first embodiment of the present invention.

Turning now to FIG. 5, the wavebreaker apparatus 100 uses a shield 500 that includes two wings 502, which extend between a lower edge 501 and an upper edge 503 of the shield. The wings 502 are joined by a convex edge or prow 504, which is located approximately medially or at a midline of the shield body 500. The lower edge 501 and the upper edge 503 are shown horizontal. The prow 504 is shown vertical, and defines the shield's height 505 between the edges 501, 503. The wings 502 extend outward from the prow 504 to distal edges or tips 506, which define a wingspan or breadth 507.

As also shown in FIG. 5, the wings 502 are depicted as being generally vertical, planar panels of substantially uniform thickness. The wing edges 506 are shown as lying generally within a plane parallel to the prow 504. In certain other embodiments (not shown) the wings 502 may taper in thickness toward or away from the prow 504. In certain embodiments, the wings may be angled, tilted, canted, or skewed away from verticality, with their inward faces upward or downward. Moreover, alternative embodiments may have the wings formed as curved panels that are outwardly convex or concave. Additionally, the lower and upper edges 501, 503 may be skewed upward or downward away from planarity, while the wingtips 506 also may be skewed toward or away from the prow 504. As will be appreciated, rather than being vertically convex as shown, the prow 504 may combine horizontal and vertical curvature, for example, horizontal concavity and vertical convexity, or a sharp edge between outwardly concave panels.

Returning to FIG. 5, the wings 502 form an angle 509 of about one hundred (100) degrees, between the prow 504 and the wingtip edges 506. The included angle 509 may alternatively be about ninety (90) degrees to about one hundred sixty (160) degrees while, in the preferred embodiment, an included angle 509 within the range of about sixty (60) to about one hundred sixty (160) degrees is envisioned, according to variables comprising anticipated surface wave parameters, shapes of the wings 502, and arrangement of the pilings 102 within the complete wavebreaker apparatus 100.

As shown, the wings 502 are joined by two or more braces or plates 508, each of which extends across the angle included by the two wings. Each brace includes a hole 510, which is shown located at the midline of the brace in registry with the prow 504. The holes in the braces are configured to slidingly receive the post 106 at least for assembly of the shield onto the post. The lowest brace is configured to support the weight of the shield 500 against the flange 108 joining the post to the piling 102. In other embodiments (not shown) the shield may be supported on the post 106 by one or more brackets fastened to the shield. Alternative modes of support and attachment, apparent to those of skill, also are intended within the scope of the invention.

In certain embodiments (not shown) the holes 510 may be offset toward one of the wings 502, such that wave impact against the panel can cause a swinging motion of the shield 500 on the post 106. In the embodiments shown in FIGS. 5 and 6, the midline or medial locations of the respective holes 510, 610 may advantageously result in a self-aligning motion wherein the shield 500 or 600 gradually shifts to face oncoming waves.

The shield wing edges 506 define a wingtip plane that is offset by a shield length 511 from the prow 504. The length 511 may be pre-selected to limit an extent of swinging motion of the shield 500 in response to pre-determined values of wave energy. In certain embodiments, as shown in FIG. 5, the shield length 511 is less than or about equal to the horizontal breadth or wingspan 507 of the shield 500. In certain embodiments, the shield length 511 is at least about twice a distance from the prow to a center of each hole 510, which locates a vertical axis of the post 106 on which the shield is mounted. In certain other embodiments, the shield length does not substantially exceed a distance from the prow 504 to the vertical axis of the post 106.

In some embodiments, the braces 508 may be vertically spaced so as to define one or more cavities 512 adjacent the wings 502. Each cavity may be configured so as to induce turbulent flow when waves engage the shield 500, thereby dissipating at least a portion of the wave energy. Each cavity also may be configured to cause vertical or twisting motion of the shield 500 on the post 106, in response to wave energy. In some embodiments, each of the braces 508 may be canted or tilted away from horizontally so as to induce vertical or twisting motion.

In FIG. 5, the holes 510 are shown as square. In some embodiments, other hole shapes may be chosen to provide at least one radial gap 514 between the post 106 and the brace 508, such that water can flow between. In various embodiments, circular, polygonal, or toothed holes may be suitable. In certain embodiments, the one or more gaps 514 between the hole and the post are designed to generate turbulent flow as wave energy engages the shield 500, thereby dissipating a significant portion of the wave energy. In other embodiments, the holes 510 may be shaped to closely fit onto the post 106, either in a sliding or in a static manner, without substantial gaps.

In some embodiments, the braces 608 may be vertically spaced so as to define one or more cavities 612 adjacent the wings 602. Each cavity may be configured so as to induce turbulent flow when waves engage the shield 600, thereby dissipating at least a portion of the wave energy. Each cavity also may be configured to cause vertical or twisting motion of the shield 600 on the post 106, in response to wave energy. In some embodiments, each of the braces 608 may be canted or tilted away from horizontally so as to induce vertical or twisting motion.

Figure 8:
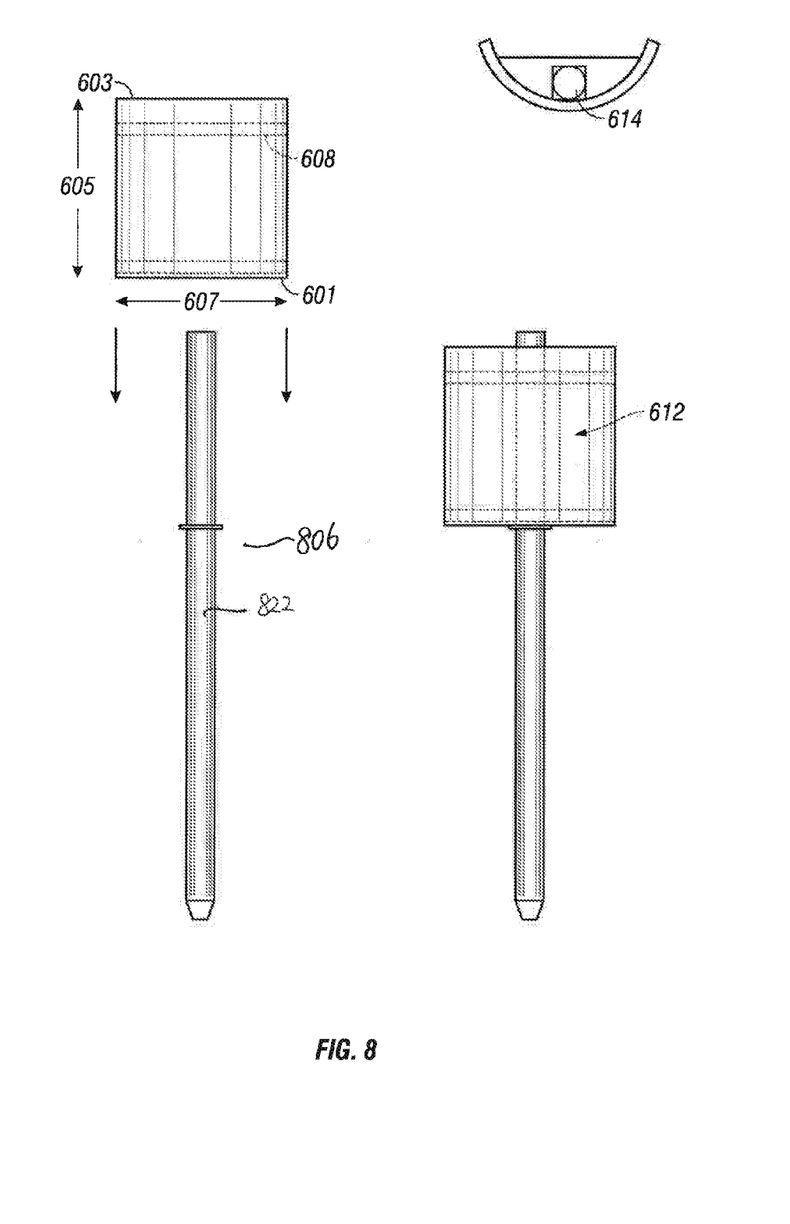
FIG. 8 shows in front elevation view the assembly of a wavebreaker according to a second embodiment of the present invention.

In FIG. 8, the holes 610 are shown as square. In some embodiments, other hole shapes may be chosen to provide at least one radial gap 614 between the post and the brace 608, such that water can flow between. In various embodiments, circular, polygonal, or toothed holes may be suitable. In certain embodiments, the one or more gaps 614 between the hole and the post are designed to generate turbulent flow as wave energy engages the shield 600, thereby dissipating a significant portion of the wave energy. In other embodiments, the holes 610 may be shaped to closely fit onto the post 106, either in a sliding or in a static manner, without substantial gaps.

Figure 6:
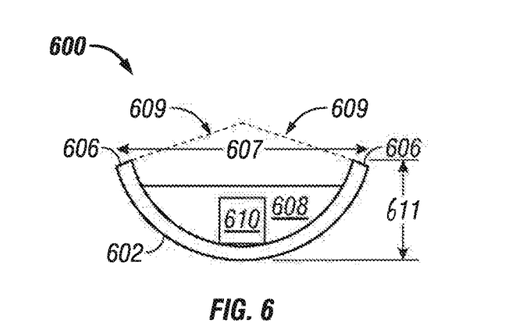
FIG. 6 shows in front elevation and plan views the assembly of a wavebreaker according to a first embodiment of the present invention.

FIG. 6 shows in plan view another embodiment of a shield 600 to be used in the inventive wavebreaker 100. The shield 600 includes a curved body or panel 602 that at least partly surrounds a vertical axis. The panel 602 has a lower edge 601 and an upper edge 603 that define a height 605 along the panel axis. The panel extends around its axis between edges 606 that define a breadth 607, an included angle 609, and a length 611. In some embodiments, the panel may be semi-cylindrical. In certain embodiments the semi-cylindrical panel may form a circular arc in a horizontal plane. In certain other embodiments, the semi-cylindrical panel may form an elliptical arc or a parabolic arc. Those of skill will recognize other functionally equivalent variations on a cylindrical or semi-cylindrical form. In some other embodiments, the panel may be semi-conical, tapered either upward or downward. Vertical asymmetry of the curved panel 602 may contribute to dissipating wave energy engaging the shield 600.

The shield 600 also includes braces 608 that extend across the concave face of the panel 602. Each brace includes a hole 610 for mounting the shield onto a post 106. In some embodiments, the holes 610 may be positioned co-axial with the shield body 602 such that the shield may be mounted coaxially onto the post 106. In other embodiments, as shown in FIG. 6, the holes 610 may be positioned within an arc segment included by the edges 606 of the semi-cylindrical body, such that the post 106 is received between the panel 602 and the vertical axis of the shield. In some embodiments, the shield 600 may include an angle of about ninety (90) degrees about the vertical axis of the semi-cylindrical panel 602. In other embodiments, the curved panel 602 may include an angle of as much as about one hundred ninety (190) degrees. In most embodiments, included angles within a range of about ninety (90) to about one hundred ninety (190) degrees may be acceptable according to anticipated surface wave parameters and according to the arrangement of the pilings 102 within the complete wavebreaker apparatus 100. As shown in FIG. 6, the edges 606 are vertical; in some other embodiments, the edges 606 may be vertically and/or horizontally swept or raked.

Although convex winged and curved shields have been shown and described, other shapes may also be acceptable to those of skill without departing from the broader aspects of the present invention. For example, in certain embodiments, one or more flat or concave panels may utilized as a shield.

Figure 7:
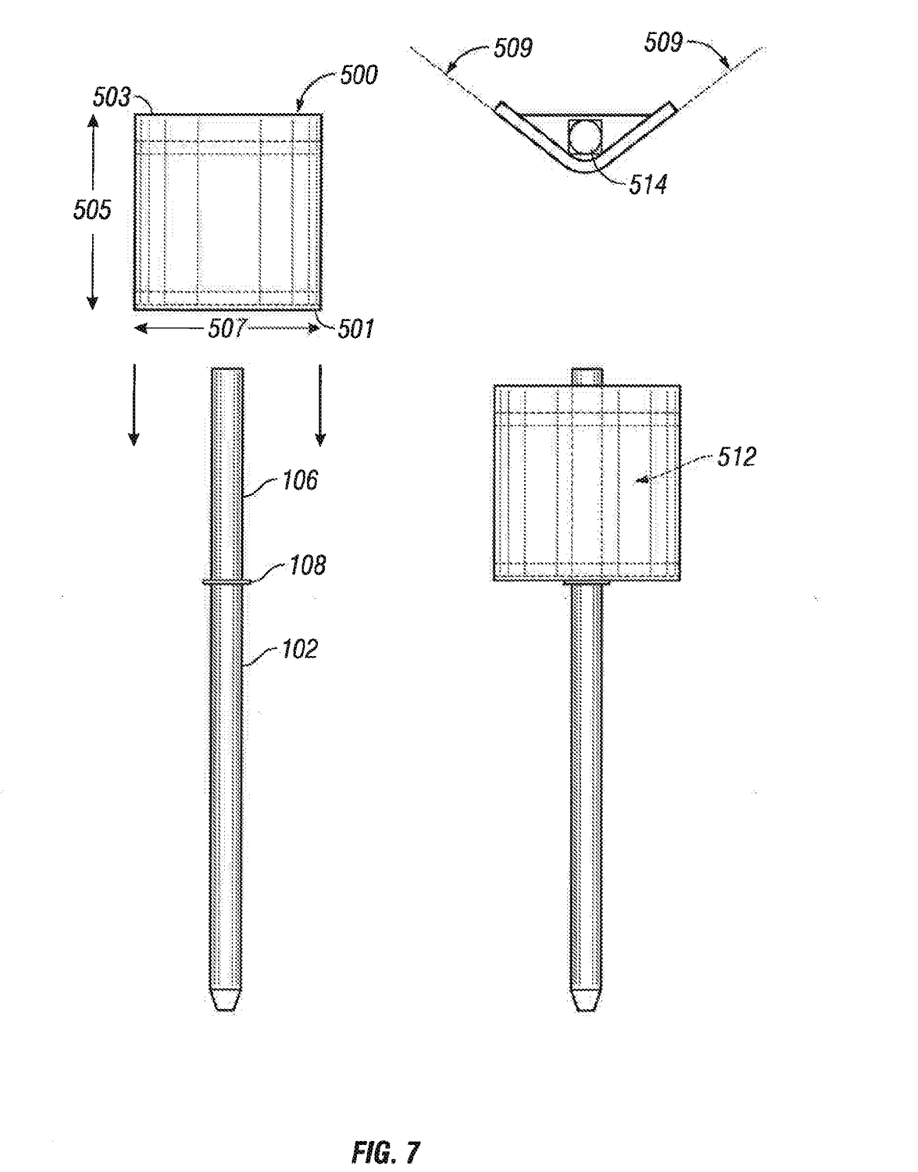
FIG. 7 shows in plan view a shield portion of a wavebreaker according to a second embodiment of the present invention.

As shown in FIGS. 7 and 8, either shield embodiment 500 or 600 may be assembled onto a post 106 by sliding the shield down onto the post 106. In some embodiments, for reasons apparent to the skilled worker, this assembly method is accomplished after the piling 102 has been embedded or anchored to the bed 24. In other embodiments, the shield and post may be assembled onto the piling after the piling has been installed.

Figure 11:
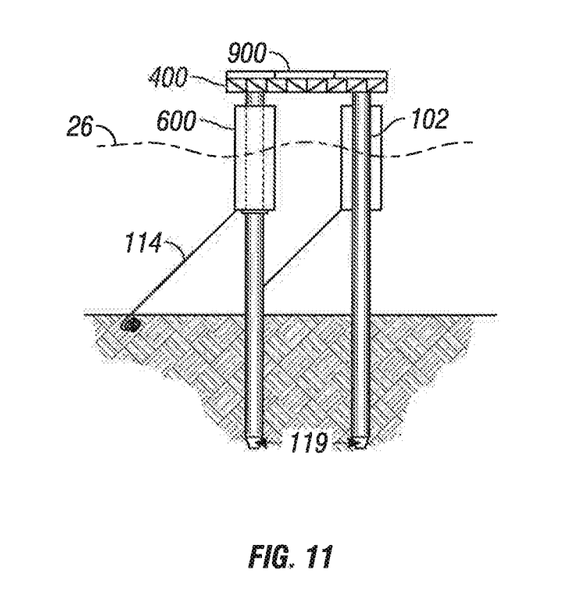
FIG. 11 shows in end elevation view the embodiment shown in FIGS. 8 and 9.

In some embodiments, during assembly, the shield 500 or 600 may be wedged onto the post 106 by inserting shims or chocks (not shown) into the gaps 506. In some embodiments the holes 510 or 610 may be keyed to the post 106 for vertical sliding motion. In certain embodiments the holes and post may be helically threaded similar to an Archimedes screw, for vertical twisting motion of the shield in response to wave energy. In some embodiments the shield may rest freely on the flange 108. Each shield 500 or 600 may be configured as negatively buoyant (tending to sink), neutrally buoyant, or positively buoyant (tending to float). In certain embodiments, selected shields may include a hollow portion (not shown) configured to achieve a pre-selected buoyancy within the water body 22. In certain embodiments, positive buoyant (floating) shields 500 or 600 may be tethered to the bed 24, for example, by a cable 114 as shown in FIGS. 4 and 11.

For reasons apparent to those of skill, each shield will be effective in dissipating wave energy and sheltering the basin 10 according to various factors, including the water depth of the shield's bottom edge 501 or 601. In this regard, ocean wave models can be summarized such that, in relatively shallow water depths of less than about one twentieth of a wave's length (or less than about three times the wave's height), vertical water motion markedly diminishes as a function of depth within the wave.

In particular, when the bottom edge 501 of a shield positioned in shallow water is disposed deeper than about one half the depth 25 of the bed 24, then water motion at the bottom edge 501 will be substantially horizontal for a wave approaching the shield from the open water 22. In some embodiments, by limiting wave action to substantially horizontal motion of the water in the basin 10, below the edges of the shields 500 or 600, it is possible to significantly reduce vertical and horizontal motion of surface water within the basin 10. In other embodiments, the lower edges of the shields may not reach below one-half the bed depth 25, but are disposed below the keel or bottom depth of boats 12 permitted to dock at the piers 14 within the basin 10. In various embodiments of the inventive wavebreaker apparatus 100, surface water action within the basin 10 is reduced sufficiently to mitigate surging or swaying motion of docked boats 12 against the piers 14. In certain embodiments, surging accelerations within the basin 10 are reduced by at least about fifty percent relative to the open water 22.

At the same time, horizontal water motion below the lower edges 501 or 601 of the shields 500, 600, including tidal, riverine, and/or storm runoff flows, still can carry sediment between the pilings 102, continuously across the bed 24 of the basin 10 and into the water body 22, thereby obviating a need for dredging on the basin side of the wavebreaker apparatus 100. For further enhancement of flow below the shield lower edges 501 or 601, the pilings 102 may be spaced apart by distances 115 at least about equal to the horizontal breadths 507 or 607 of the shields 500 or 600. In some embodiments, the distances 115 may be at least about three times the breadth of the pilings 102. In certain embodiments, the distances 115 may be at least about four times the breadth of the pilings 102. In certain embodiments, the distances 115 may be no more than about seven times the breadth of the pilings 102. In some embodiments, pilings 102 may be horizontally staggered so as to achieve inter-piling spacings less than the breadths of the shields 500 or 600.

Additionally, in some embodiments, the upper edge 503 or 603 of each shield 500 or 600 may be disposed above a seasonal average wave height or a seasonal peak storm wave height. Even waves that overpeak the upper edges of the shields, may be expected to break against the shields 500 or 600 and/or against the walkway 18, so that even in storm conditions the wavebreaker apparatus 100 can effectively keep surface waves out of the basin 10. Therefore, in select embodiments, the shield height 505 or 605 from lower edge 501 or 601 to upper edge 503 or 603 is pre-selected according to measured wave heights and water depths at an active boundary of the basin 10, where the wavebreaker 100 is meant to be installed. The flange depth 109 also is pre-selected according to these factors, and also according to the disposition of the lowest brace 508 or 608 along the height of the shield.

In some embodiments of the inventive wavebreaker 100, motion of the shields 500 or 600 on the posts 106 may serve to dissipate or absorb at least a portion of wave energy engaging the shield. In some embodiments each shield may be coupled to its post only by friction. In other embodiments the post and shield may also be electromagnetically coupled. In certain embodiments, for example as shown in FIG. 8, a shield may include permanent magnets while a post 806 includes linear generator windings 822. The windings 822 may be connected electrically to a power controller or converter (not shown) mounted on-shore or atop the wavebreaker apparatus 100. In some embodiments, the windings 822 may provide at least a portion of the power requirements for docked boats 12 and/or for a hospitality structure 16 as shown in FIG. 1. In other embodiments, motion of the shield 500 or 600 may drive flow in a fluid circuit housed in the piling 102.

In some embodiments of the inventive wavebreaker 100, the shields 500 or 600 may passively interact with oncoming waves to reflect, refract, or diffract wave energy. It should be noted, with reference to FIGS. 2-4 and 9-11, that the shields 500, 600 are disposed in staggered fashion, generally across a direction of oncoming waves. Additionally, the edges 506, 606 of adjacent shields disposed along a first or forward contour 116 are spaced apart by distances 117, while other shields are disposed along a second or rearward contour 118 that is offset from the first contour by an intra-contour distance 119. The distances 117 and 119 may be chosen according to at least bed depth 25, shield dimensions 507, 509, 511, and piling spacings 115 along each contour, and may vary along the length of the wavebreaker apparatus 100, such that in some embodiments, waves or wakes diffracted from edges of the shields along the first contour will destructively interfere with each other within the area bounded by the first and second contours. Those of skill will understand that in certain embodiments, diffraction from the first contour will be effective only within a pre-determined range of wave heights or periods, and that the shields disposed along the second contour therefore provide structure for canceling or reflecting waves that exceed the predetermined range of wave heights dissipated by the first contour. Accordingly, shields within the first and second contours may differ in size or shape based on the pre-selected ranges of waves to be reflected, diffracted, and/or canceled.

In other embodiments, shields disposed along the first and second contours may cooperate to cause mutual destructive interference of waves beyond the second contour. Additional contours of pilings and shields may also be included in the scope of the invention. In some embodiments, bed depth 25 may also be adjusted along each contour for enhanced control of wave motion. In certain embodiments, while still permitting horizontal flow of water from the basin 10 into the general water body 22, bed depth 25 may be adjusted to break waves of height exceeding the shield heights 505, 605.

The pilings 102, the shields 500 or 600, and the posts 106 may be fabricated from various materials. In the embodiments shown, the pilings and shields are pre-cast from marine concrete. Other potentially acceptable materials include woods (especially water-resistant varietals), metals (especially alloys that resist galvanic and chloride corrosion), or durable plastics. The posts likewise may be formed of concrete, wood, metal, or plastic. In embodiments where the shields can slide on the posts, either metal, plastic, or very smooth wood inserts are preferred for the surfaces in sliding contact.

Figure 9:
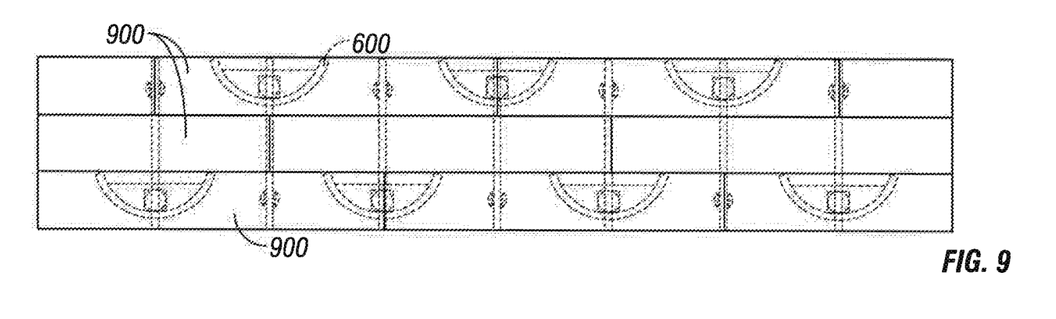
FIG. 9 shows in plan view another embodiment of the present invention, in which an inventive wavebreaker supports segments of a walkway.
Figure 10:
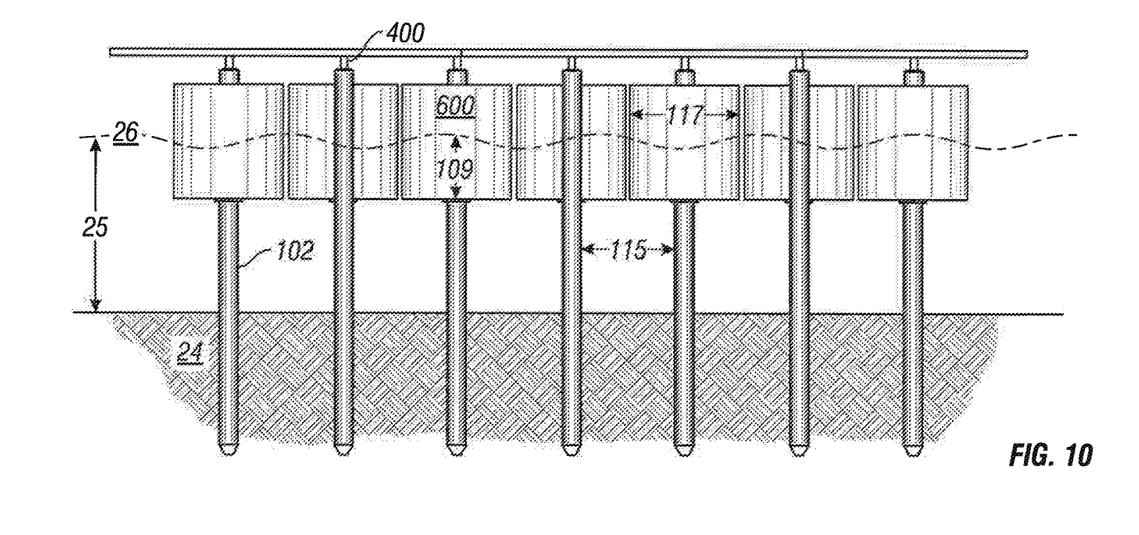
FIG. 10 shows in front elevation view the embodiment shown in FIG. 9.

FIGS. 9-11 show an embodiment of the inventive wavebreaker 100 supporting girders 400 and walkway segments 900. The girders may be manufactured of wood, metal, reinforced concrete, fiber-reinforced plastic, or thermoset polymer, according to anticipated loading. The walkway segments likewise may be fabricated from a variety of materials, including without limitation wood, concrete, metal, or plastics.

As discussed above, the present invention provides a protective maritime assembly which may be modularly fabricated and assembled, and which provides protection to maritime vessels and associated marinas at a fraction of the costs of, e.g., known rock/rubble dykes, while also preserving to the greatest extent possible the marine environment in and around the proposed protective maritime assembly.

The present invention accomplishes these objectives by forming one or more energy-dissipating panels atop a respective piling, typically configured about an area of water (i.e., the opening of a marina) that is to be protected. The panels themselves may be buoyant, non-buoyant, or partially-buoyant (in dependence upon their specific application), and are preferably fashioned to be capable of a limited degree of rotation about each respective piling.

Also of import is that the panels themselves do not extend all the way down the pilings, rather the panels are configured to rest on and about only the upper portion of each piling, thereby permitting an uninterrupted flow of water thereunder and in this manner minimizing damage to any underwater structures, corals or existing animal life.

As will be appreciated, incoming waves will impact one or more of the panels of the present invention, with the energy of the incoming waves being dissipated through their impact on, and deflection of, each panel. As discussed herein previously, the panels themselves may enjoy one or more structural configurations and elements that may be particularly suitable for any particular application, without departing from the broad aspects of the present invention (such as, but not limited to, alterations in the size and configuration of the panels, the angular relationship of the wings of the panels with each other and the piling, as well as the depth at which the panels are mounted to the pilings).

As also discussed, the wings, or sides, of each panel may also be equipped with anchors, tethers or other restraining devices which serve to inhibit the rotation of the panel about its piling, thus providing a degree of fine tuning to the energy-dissipating effects of the panels.

The present invention has also illustrated the method of protecting a given marina by arranging a plurality of the disclosed panels and pilings in a matrix-like pattern about the entrance to the marina. By controlling the number and spacing of each of these panel-piling modular units, it becomes possible to effectively absorb enough of the energy from the incoming waves so that the marina and any vessels therein are spared from the worst effects of the waves, all without harming the marine environment or requiring the construction of timely and costly earthen barriers.

Still further, the pilings of the present invention can serve many uses, including acting as the superstructure for marina walkways, dockings or the like.

Although this invention has been shown and described with respect to the detailed embodiments thereof, it will be understood by those skilled in the art that various changes in form and detail thereof may be made without departing from the spirit and the scope of the invention.

What is claimed is:

1. A protective maritime assembly, comprising:
   a piling;
   a substantially convex energy-dissipating panel, said panel being moveably mounted onto an upper portion of said piling; and
   a positioning device, said positioning device arresting said panel such that movement of said panel along a length of said piling is controlled,
   wherein said panel has wings that are formed at a predetermined angle to one another, and is moveable relative to said piling in response to wave energy,
   wherein said panel includes a cross-brace extending between said wings; and
   an aperture formed in said cross-brace, said aperture dimensioned to accept said piling therethrough.

* * * * *